(12) United States Patent
Grand

(10) Patent No.: US 12,706,318 B2
(45) Date of Patent: Aug. 11, 2026

(54) VOLTAGE MEASURING DEVICE FOR MEASURING THE VOLTAGE OF A PLURALITY OF ELECTROCHEMICAL CELLS OF AN ELECTROCHEMICAL REACTOR

(71) Applicant: ALSTOM Hydrogène SAS, Aix en Provence Cedex (FR)

(72) Inventor: Pierrick Grand, Les Milles (FR)

(73) Assignee: ALSTOM HYDROGÈNE SAS, Aix-en-Provence (FR)

( * ) Notice: Subject to any disclaimer, the term of this patent is extended or adjusted under 35 U.S.C. 154(b) by 882 days.

(21) Appl. No.: 17/752,532

(22) Filed: May 24, 2022

(65) Prior Publication Data

US 2022/0384826 A1 Dec. 1, 2022

(30) Foreign Application Priority Data

May 26, 2021 (FR) ..................................... 21 05461

(51) Int. Cl.

*H01M 8/04537* (2016.01)
*H01M 8/0254* (2016.01)
*H01M 8/10* (2016.01)
*H01M 8/1004* (2016.01)

(52) U.S. Cl.

CPC ..... *H01M 8/04559* (2013.01); *H01M 8/0254* (2013.01); *H01M 8/1004* (2013.01); *H01M 2008/1095* (2013.01)

(58) Field of Classification Search

CPC ......... H01M 8/04544; H01M 8/04552; H01M 8/04559

See application file for complete search history.

(56) References Cited

U.S. PATENT DOCUMENTS

2003/0215678 A1 11/2003 Barton et al.
2004/0227518 A1 11/2004 Joos et al.
2007/0108960 A1 5/2007 Chang et al.
(Continued)

FOREIGN PATENT DOCUMENTS

DE 10 2005 050 500 5/2007
WO 2014/060727 4/2014

OTHER PUBLICATIONS

Search Report for FR Application No. 2105461 dated Feb. 15, 2022, 2 pages.

*Primary Examiner* — Allison Bourke
*Assistant Examiner* — Travis L. Martin
(74) *Attorney, Agent, or Firm* — NIXON & VANDERHYE

(57) ABSTRACT

The voltage measuring device is configured for measuring the voltage of a plurality of electrochemical cells (10) of an electrochemical reactor formed by a stack of separators (6) and membrane-electrode assemblies (8), each electrochemical cell (10) being formed by a membrane-electrode assembly (8) interposed between two separators (6), the voltage measuring device comprising a support (22) having a base (24) and a plurality of teeth (26) extending from the base (24) in a common direction of extension (D), each tooth (26) having a proximal end (26A) connected to the base (24) and a free distal end (26B) carrying an electrical contact (28) adapted to engage a separator, the support comprising teeth (26) the distal ends of which are offset from each other in the direction of extension (D).

18 Claims, 6 Drawing Sheets

(56) References Cited

U.S. PATENT DOCUMENTS

| | | | | |
|---|---|---|---|---|
| 2007/0154755 | A1 * | 7/2007 | Wardrop | H01M 8/04955 429/432 |
| 2008/0220294 | A1 | 9/2008 | Miller et al. | |

* cited by examiner 2
10
4
6
V
20
20
4A
E

20
T
P
40
26B
28
28
A1
42
26B
50
26
26
D
22
26A
26A
24A
24
44
46
24B
26A
52
26
26B
A2
28
L1
L2

VOLTAGE MEASURING DEVICE FOR MEASURING THE VOLTAGE OF A PLURALITY OF ELECTROCHEMICAL CELLS OF AN ELECTROCHEMICAL REACTOR

CROSS-REFERENCE TO RELATED APPLICATIONS

This application claims priority to French Patent Application No. 21 05461 filed May 26, 2021, the entire contents of which are hereby incorporated by reference.

TECHNICAL FIELD

The present invention relates to the field of electrochemical reactors comprising a stack of separators and membrane-electrode assemblies defining electrochemical cells.

BACKGROUND

Such an electrochemical reactor is for example a fuel cell for the production of electricity by electrochemical reaction between an oxidant and a fuel, or an electrolyzer for the separation of chemical elements from a fluid using electricity, for example for the production of dihydrogen and dioxygen from water.

In such an electrochemical reactor, each membrane-electrode assembly presents in the form of a laminate comprising an ion exchange membrane inserted between two electrodes.

Each separator presents in the form of a plate, with one or each of the two faces of the separator being configured to be held against a face of a membrane-electrode assembly defining with that face of the membrane-electrode assembly a fluidic chamber for the circulation of a fluid along said face of the membrane-electrode assembly.

Each electrochemical cell is defined by a membrane-electrode assembly enclosed between two separators, each of the separators defining a fluidic chamber with the face of the membrane-electrode assembly against which it is held, the electrochemical reaction being realized by exchange of ions between fluids circulating through the membrane-electrode assembly in the fluidic chambers.

Bipolar separators may be provided, each bipolar separator being interposed between two membrane-electrode assemblies, each of the two faces of each bipolar separator being configured to be held against a face of a respective membrane-electrode assembly, defining a fluidic chamber therewith.

An electrochemical reactor comprises, for example, an alternating stack of bipolar separators and membrane-electrode assemblies, with two end separators added to the ends of the stack to complete the two electrochemical cells at the ends of the stack.

During operation of the electrochemical reactor, it is desirable to monitor the electrical voltage of one or more electrochemical cells, for example, to verify that the electrical voltage of that electrochemical cell or those electrochemical cells remains within an appropriate voltage range, and thereby prevent a defect or degradation of the electrochemical reactor.

In practice, an electrochemical reactor formed of a stack of separators and membrane-electrode assemblies may comprise several tens or several hundreds of electrochemical cells. In addition, the separators and membrane-electrode assemblies present low thicknesses. Thus, connecting each electrochemical cell to a measuring device can be tedious.

In addition, the electrochemical cells in such a stack may present variability in their spacing, thickness, and positioning, which complicates the design of a connector for connecting electrochemical cells to an electronic measurement device.

WO2014060727A1 discloses a connection device for electrically connecting separators to an electronic measuring device, the connection device comprising a comb-shaped support having teeth each carrying an electrical contact, the support being provided such that each electrical contact can make electrical contact with a contact area of a separator.

SUMMARY OF THE INVENTION

One of the purposes of the invention is to provide a measuring device for measuring the voltage of electrochemical cells, the measuring device being simple and quick to implement.

To this end, the invention proposes a voltage measuring device for measuring the voltage of a plurality of electrochemical cells of an electrochemical reactor formed by a stack of separators and membrane-electrode assemblies, each electrochemical cell being formed by a membrane-electrode assembly interposed between two separators, the voltage measurement device comprising a support having a base and a plurality of teeth extending from the base along a common direction of extension, each tooth having a proximal end connected to the base and a free distal end carrying an electrical contact able to make contact with a separator, the support comprising teeth whose distal ends are offset from each other along the direction of extension.

The electrical contacts carried by teeth of a support having their distal ends offset along the direction of extension of the teeth facilitate mounting of the voltage measuring device on a side face of the stack, ensuring that the electrical contact carried by each tooth can be brought into contact with a respective separator without being impeded by or interfering with an adjacent tooth or teeth.

This also facilitates relative movement of the teeth by flexing of these latter to accommodate variability in separator spacing, thickness and/or positioning during assembly, as well as thermal expansion or contraction of the stack during operation of the electrochemical reactor.

According to particular embodiments, the voltage measurement device comprises one or more of the following optional features, individually or in any technically feasible combination:

- the teeth include teeth whose distal ends are aligned along a first alignment axis and teeth whose distal ends are offset from the first alignment axis;
- the first alignment axis is perpendicular to the direction of extension;
- the support comprises a row of teeth in which teeth, the distal ends of which are aligned along a first alignment axis, alternate with teeth, the distal ends of which are offset relative to the first alignment axis
- the teeth the distal ends of which are offset from the first alignment axis have their distal ends aligned along a second alignment axis distinct from the first alignment axis;
- the second alignment axis is perpendicular to the direction of extension and/or parallel to the first alignment axis;
- the teeth include teeth of different length;

- it comprises teeth presenting a first length and teeth presenting a second length, the first length being strictly greater than the second length;
- the support comprises a row of teeth in which teeth presenting the first length and teeth presenting the second length alternate;
- the teeth are distributed between a first row of teeth and a second row of teeth located on either side of the base;
- at least one or each tooth presents a progressively decreasing and then increasing width from the proximal end of the tooth towards the distal end of the tooth;
- the support comprises a row of teeth having a first tooth carrying an additional electrical contact configured to make contact with a separator adjacent to the one with which the electrical contact carried by that first tooth makes contact;
- it comprises an electronic measuring unit, each electrical contact being connected to the electronic measuring unit, the electronic measuring unit being configured to generate a respective voltage measurement signal for each electrochemical cell the voltage of which is taken by the voltage measuring device, from electrical signals provided by the electrical contacts and/or to condition the electrical signals provided by the electrical contacts and/or the voltage measurement signal generated by the electronic measuring unit, for transmission to an electronic apparatus;
- it comprises a connector for connecting the voltage measuring device to an electronic apparatus.

The invention also relates to an electrochemical system comprising an electrochemical reactor formed by a stack of separators and membrane-electrode assemblies defining electrochemical cells, each electrochemical cell being formed by a membrane-electrode assembly interposed between two separators, and at least one voltage measuring device as defined above.

BRIEF DESCRIPTION OF THE DRAWINGS

The invention and its advantages will be better understood upon reading the following description, given only as an example and not in any way limiting, and made with reference to the appended drawings, in which.

DETAILED DESCRIPTION OF PREFERRED EMBODIMENTS

Figure 1:
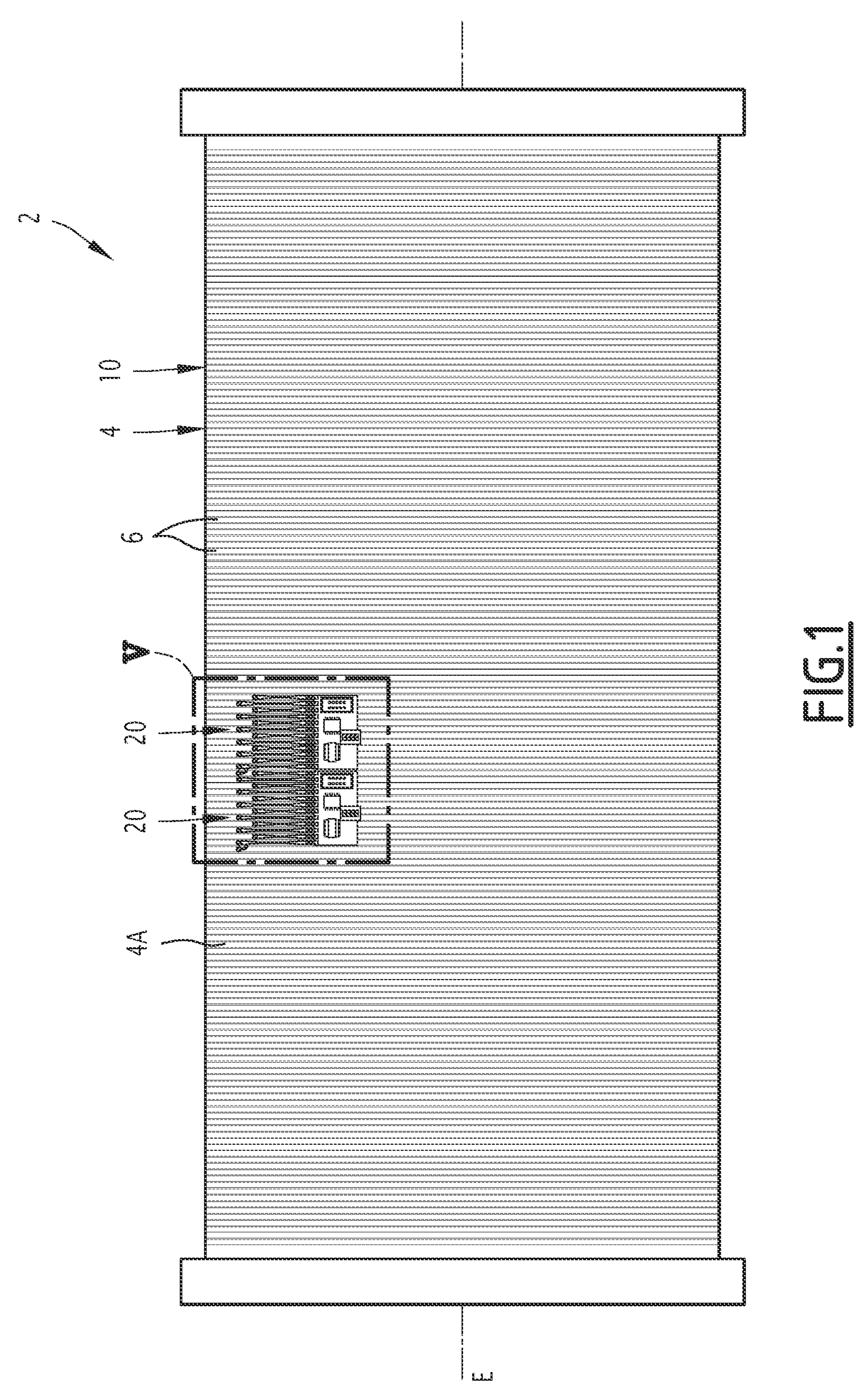
FIG. 1 is a side view of an electrochemical reactor formed by a stack of separators and membrane-electrode assemblies, equipped with voltage measuring devices.
Figure 2:
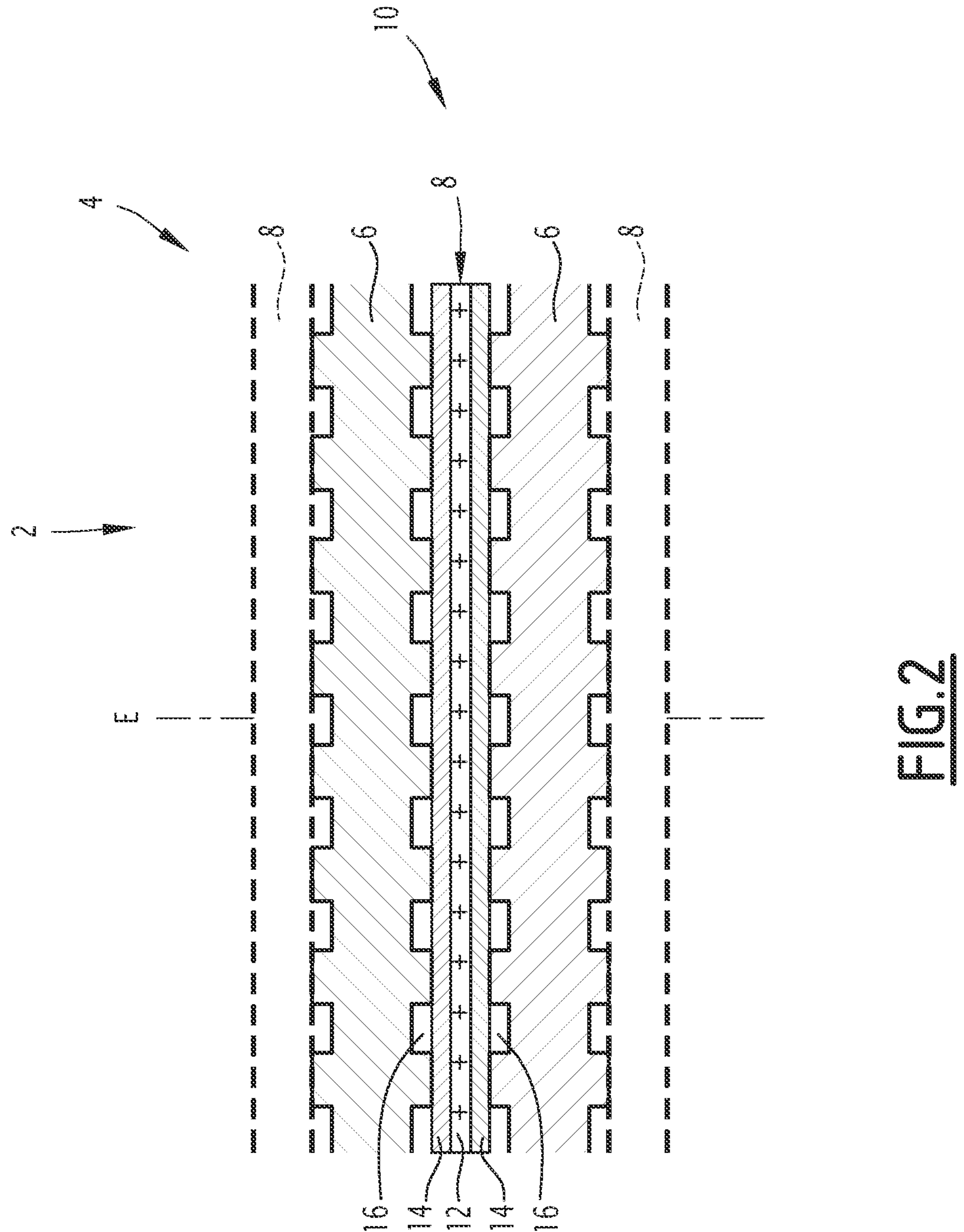
FIG. 2 is a cross-sectional view of the electrochemical reactor, illustrating an electrochemical cell formed by a membrane-electrode assembly interposed between two bipolar separators

The electrochemical reactor 2 illustrated in FIGS. 1 and 2 has a stack 4 of separators 6 and membrane-electrode assemblies 8 (FIG. 2) defining a plurality of stacked electrochemical cells 10.

The separators 6 and the membrane-electrode assemblies 8 are stacked along a stacking direction E. The electrochemical cells 10 are superimposed along the stacking direction E.

In practice, an electrochemical reactor 2 may comprise several tens or hundreds of electrochemical cells 10 stacked on top of each other.

As illustrated in FIG. 2, in the stack 4, each electrochemical cell 10 is formed by a membrane-electrode assembly 8 interposed between two separators 6.

The membrane-electrode assembly 8 is in the form of a laminate formed by an ion exchange membrane 12 interposed between two electrodes 14. The ion exchange membrane 12 is, for example, a proton exchange membrane (or PEM).

Each separator 6 presents in the form of a plate.

In each electrochemical cell 10, each separator 6 is held against a respective face of the membrane-electrode assembly 8.

Each of the two separators 6 in the electrochemical cell 10 has its face held against the membrane electrode assembly 8 which is configured to channel a fluid along the face of the membrane electrode assembly 8 against which the separator 6 is held.

The face of the separator 6 held against the membrane-electrode assembly 8 defines with it a fluidic chamber for the circulation of the fluid. It comprises, for example, distribution channels 16 for the circulation of the fluid. The distribution channels 16 together define the fluidic chamber.

In operation, in each electrochemical cell 10, the fluids circulating along the two opposing sides of the membrane-electrode assembly 8 allow an electrochemical reaction to take place with ion exchange between the fluids channeled by the two separators 6 located on either side of the membrane-electrode assembly 8, with the ions passing through the membrane-electrode assembly 8.

If the electrochemical reactor 2 is a fuel cell, one of the two separators 6 is configured to channel a fuel fluid along the side of the membrane-electrode assembly 8 against which it is held, the other separator 6 being configured to channel a oxidizer fluid along the other side of the membrane-electrode assembly 8 against which it is applied.

The stack 4 comprises, for example, bipolar separators 6, each bipolar separator 6 being interposed between two membrane-electrode assemblies 8, each of the two faces of the separator 6 being configured to channel a fluid along the face of the membrane-electrode assembly 8 against which that face of the separator 6 is held. Each bipolar separator 6 is common to two adjacent electrochemical cells 10.

The stack 4 comprises, for example, monopolar separators 6, each monopolar separator 6 having only one of its two faces held against a face of a membrane-electrode assembly 8, this face of the separator 6 being configured to channel a fluid along said face of the membrane-electrode assembly 8. Each monopolar separator 6 belongs to a single electrochemical cell 10.

The stack 4 is, for example, formed of bipolar separators 6 stacked alternately with membrane-electrode assemblies 8, with two monopolar separators 6 arranged at the ends of the stack 4 to define the two electrochemical cells 10 located at the ends of the stack 4.

Each separator 6 is made of an electrically conductive material. For example, each separator 6 is formed from a metallic material, a graphite-based material or a graphite-polymer composite.

In the stack 4 of the electrochemical reactor 2, the electrochemical cells 10 are electrically connected in series. Each electrochemical cell 10 is electrically connected to the next electrochemical cell 10.

In operation, each electrochemical cell 10 presents an electrical voltage that corresponds to the electrical potential difference between the two separators 6 of that electrochemical cell 10.

The electrochemical reactor 2 is equipped with at least one voltage measuring device 20, each voltage measuring device 20 being configured to measure the voltage of a plurality of adjacent electrochemical cells 10 in the stack 4.

As illustrated in FIG. 1, the electrochemical reactor 2 is equipped with two similar voltage measuring devices 20. Only one voltage measuring device 20 will be described in more detail with reference to FIG. 3.

Figure 3:
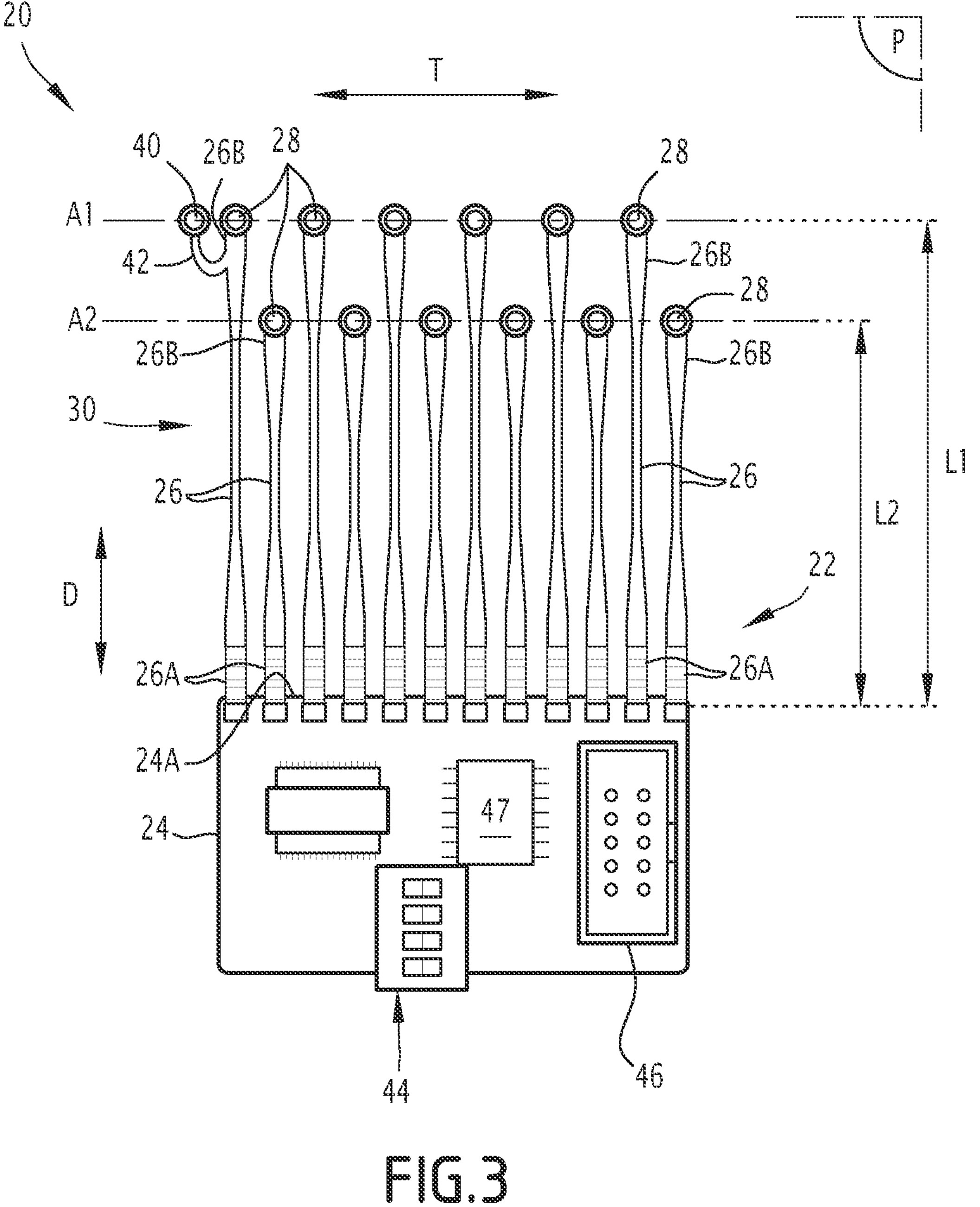
FIG. 3 is a front view of a voltage measurement device.

As illustrated in this FIG. 3, the voltage measuring device 20 comprises a support 22 having a base 24 and a plurality of teeth 26 extending from the base 24 along a direction of extension D. The teeth 26 extend parallel to each other.

Each tooth 26 has a proximal end 26A connected to the base 24 and a distal end 26B carrying an electrical contact 28. Each tooth 26 carries a respective electrical contact 28.

The electrical contact 28 carried by each tooth 26 is preferably located at the distal end 26B of that tooth 26.

Each tooth 26 is preferably provided with a single electrical contact 28 arranged on the tooth 26, in particular on the distal end 26B thereof, each electrical contact 28 being intended to contact a respective separator 6 of the stack 4.

The support 22 comprises teeth 26 arranged side by side forming a row 30 of teeth 26. The teeth 26 forming a row 30 extend along the direction of extension D from an edge 24A of the base 24.

The support 22 is configured such that the electrical contacts 28 can be brought into contact with the separators 6 of the electrochemical cells 10 the voltage of which is measured using the voltage measuring device 20.

Figure 4:
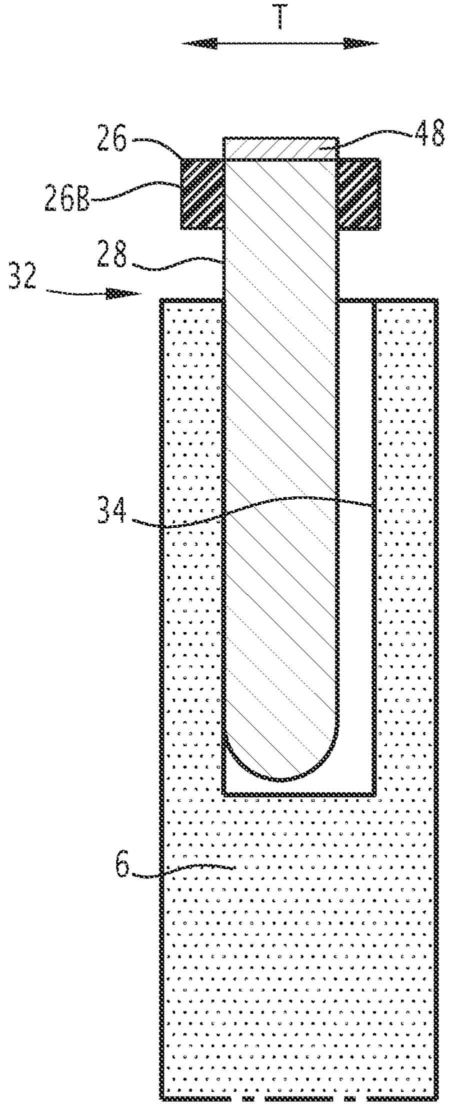
FIG. 4 is a cross-sectional view of an electrical contact of the voltage measuring device in contact with a separator.

As illustrated in FIG. 4 representing a distal end 26B of a tooth 26 carrying an electrical contact 28, the support 22 is configured such that each electrical contact 28 comes into contact with a contact area 32 of a respective separator 6 from among the separators 6 of the electrochemical cells 10, the voltage of which is measured using the voltage measuring device 20.

The contact area 32 of each separator 6 is, for example, located on a side face 4A of the stack 4.

In particular, advantageously, the contact area 32 of each separator 6 is located on a peripheral edge of the separator 6, the contact area 32 being exposed on the side face 4A of the stack 4.

Thus, the voltage measuring device 20 may be mounted on the side face 4A of the stack 4 so as to bring the electrical contacts 28 into contact with the separators 6 of the electrochemical cells 10 the voltage of which is measured using the voltage measuring device 20.

Advantageously, each electrical contact 28 presents in the form of a contact pin, with the contact area 32 of each separator 6 presenting an opening 34 configured to receive the electrical contact 28, this latter being inserted into the opening 34. When the voltage measuring device 20 is mounted on the stack 4, each electrical contact 28 inserts into an opening 34 of a respective separator 6.

Returning to FIG. 3, preferably, the teeth 26 extend in a common extension plane P (the plane of FIG. 3). The extension plane P contains the direction of extension D and a transverse direction T perpendicular to the direction of extension D.

Preferably, the voltage measuring device 20 is configured to be mounted on a side face 4A of the stack 4 such that the direction of extension D of the teeth 26 is perpendicular to the stacking direction E. The transverse direction T is parallel to the stacking direction E.

Each tooth 26 extends parallel to the edge of a respective separator 6, more particularly along the edge of the separator 6 with which the electrical contact 28 carried by that tooth 26 is in contact.

The teeth 26 are transversely spaced from each other so that the voltage measuring device 20 can be mounted on the stack 4 with each tooth 26 facing a respective separator 6.

In one example of the embodiment, the transverse spacing between two successive teeth 26 of a row 30 of teeth 26 corresponds to the spacing between two successive separators 6 of the stack 4.

Advantageously, each tooth 26 is configured to laterally flex in an elastic manner. Lateral flexing of a tooth 26 occurs in the plane of extension P. Lateral flexing of each tooth 26 results in displacement of the electrical contact 28 carried by that tooth 26 along the transverse direction T.

The lateral flexing of the teeth 26 allows to compensate for the positioning variability of the separators 6 and/or of the openings 34 of the contact areas 32 of the separators 6, as well as for possible relative displacement of the contact areas 32 due, for example, to thermal expansion or contraction of the stack 4, in particular during the operation of the electrochemical reactor 2.

In one example of the embodiment, each tooth 26 presents a width that gradually decreases and then gradually increases from the proximal end 26A of the tooth 26 towards the distal end 26B of the tooth 26. Each tooth 26 is less wide in an intermediate region of the tooth 26 than at its distal end 26A and at its proximal end 26B. The width of each tooth 26 is taken along the transverse direction T.

This provides lateral flexibility to the tooth 26 while ensuring a reliable connection to the base 24 and a reliable connection to the electrical contact 28 carried by the distal end 26A of the tooth 26.

The support 22 comprises teeth 26 the distal ends 26A of which are offset from each other along the direction of extension D.

This facilitates the mounting of the voltage measuring device 20 on the stack 4 by allowing the electrical contact 28 carried by each tooth 26 to be positioned with less interference from adjacent teeth 26.

In one example of the embodiment, as illustrated in FIG. 3, a row 30 of teeth 26 arranged side by side includes teeth 26 having their distal ends 26A offset from each other along the direction of extension D.

Advantageously, each tooth 26 in the row 30 has its distal end 26B offset along the direction of extension D relative to the distal end 26B of each adjacent tooth 26 in the row 30.

In particular, each tooth 26 in the row 30 located between two other adjacent teeth 26 in the row 30 has its distal end 26B offset along the direction of extension D relative to the distal ends 32B of the other two adjacent teeth 26 in the row 30.

In one example of the embodiment, the support 22 comprises teeth 26 the distal ends 26B of which are aligned along a first alignment axis A1 and other teeth 26 the distal ends 26B of which are offset relative to the first alignment axis A1.

In particular, the support 22 comprises a row 30 of teeth 26 arranged side by side including the teeth 26, forming a first group, the distal ends 26B of which are aligned along a first alignment axis A1 and teeth 26, forming a second group, the distal ends 26B of which are offset relative to the first alignment axis A1.

The teeth 26 of the first group and the teeth 26 of the second group are, for example, arranged alternately in the row 30.

Thus, each tooth 26 has its distal end 26A offset along the direction of extension D relative to the distal end 26A of each adjacent tooth 26 in the row 30.

The first alignment axis A1 is, for example, perpendicular to the direction of extension D. The first alignment axis A1 is then parallel to the transverse direction T.

In one example of the embodiment, the teeth 26 of the second group have their distal ends 26B aligned along a second alignment axis A2 distinct from the first alignment axis A1.

In particular, the support 22 comprises a row 30 of teeth 26 arranged side by side including the teeth 26, the distal ends 26B of which are aligned along a first alignment axis A1 and the teeth 26 the distal ends 26B of which are aligned along a second alignment axis A2 distinct from the first alignment axis A1.

In this case, the support 22 comprises a row 30 of teeth 26 comprising a first group of the teeth 26 the distal ends 26B of which are aligned along the first alignment axis A1 and a second group of teeth 26 the distal ends 26B of which are aligned along a second alignment axis A2 distinct from the first alignment axis A1.

In a particular example embodiment, the second alignment axis A2 is perpendicular to the direction of extension D and/or parallel to the first alignment axis A1.

Thus, in a particular example of the embodiment shown in FIG. 3, the support 22 comprises a row 30 formed of a first group of teeth 26 the distal ends 26B of which are aligned along the first alignment axis A1 and a second group of teeth 26 the distal ends 26B of which are aligned along a second alignment axis A2 distinct from the first alignment axis A1, the first alignment axis A1 and the second alignment axis A2 both being perpendicular to the direction of extension D.

In one example of the embodiment, the teeth 26 of the support 22 include teeth 26 of different lengths.

This allows for a row 30 of teeth 26 extending from a same edge 24A of the base 24 that is substantially perpendicular to the direction of extension D, the teeth 26 having distal ends 26B offset along the direction of extension D.

In one example of the embodiment, the support 22 includes teeth 26 presenting a first length L1 and teeth 26 presenting a second length L2, the first length L1 being strictly greater than the second length L2.

In a particular example of the embodiment, the support 22 comprises a row 30 of teeth 26 arranged side by side, including a first group of teeth 26 presenting a first length L1 and a second group of teeth 26 presenting a second length L2, the first length L1 being strictly greater than the second length L2.

Preferably, the teeth 26 of the first group and the teeth 26 of the second group are arranged alternately in the row 30.

In the example of the embodiment illustrated in FIG. 3, the holder 22 comprises the row 30 formed of teeth 26 presenting a first length L1 alternating with teeth 26 presenting a second length L2 strictly less than the first length L1. The teeth 26 extend from the edge 24A of the base 24, this edge 24A being substantially perpendicular to the direction of extension D. The distal ends 26B of the teeth 26 presenting the first length L1 are aligned along the first alignment axis A1 perpendicular to the direction of extension D and the teeth 26 presenting the second length L2 are aligned along the second alignment axis A2 perpendicular to the direction of extension D.

A row 30 of teeth 26 arranged side by side comprises, moving from one end of the row 30 towards the other end of the row 30, a first tooth 26 and a last tooth 26.

Optionally, the support 22 comprises a row 30 of teeth 26, the first tooth 26 of which carries an additional electrical contact 40 configured to make contact with a separator 6 adjacent to the separator 6 which is in contact with the electrical contact 28 carried by said first tooth 26.

The additional electrical contact 40 is, for example, mounted on an extension 42 extending laterally from the tooth 26 on the side opposite the second tooth 26 of the row 30 adjacent to the first tooth 26.

The extension 42 joins the first tooth 26 remote from the proximal end of the first tooth 26

As shown in FIG. 3, the first tooth 26 in the row 30 is the leftmost tooth 26 in the row 30 and the last tooth 26 in the row 30 is the rightmost tooth 26 in the row 30. Of course, the configuration could be reversed.

Advantageously, the voltage measuring device 20 is configured to be arranged adjacent to another voltage measuring device 20 such that the two voltage measuring devices 20 measure the voltages of two adjacent electrochemical cell groups 10, without mechanical interference between the two voltage measuring devices 20, in particular without mechanical interference of the extension 42 of one of the two voltage measuring devices 20 with the other voltage measuring device 20.

In one example of the embodiment, the distal end 26B of the first tooth 26 is more advanced along the direction of extension D than the distal end 26B of the last tooth 26. In particular, the extension 42 is more advanced along the direction of extension D than the distal end 26B of the last tooth 26.

In the example of the embodiment shown in FIG. 3, the first tooth 26 in the row 30 presents a first length L1, and the last tooth 26 in the row 30 (located at the right-hand end of the row 30) presents a second length L2 that is strictly less than the first length L1. The extension 42 joins the first tooth 26 at a distance from the proximal end 26A of said first tooth 26 that is strictly greater than the second length L2.

Figure 5:
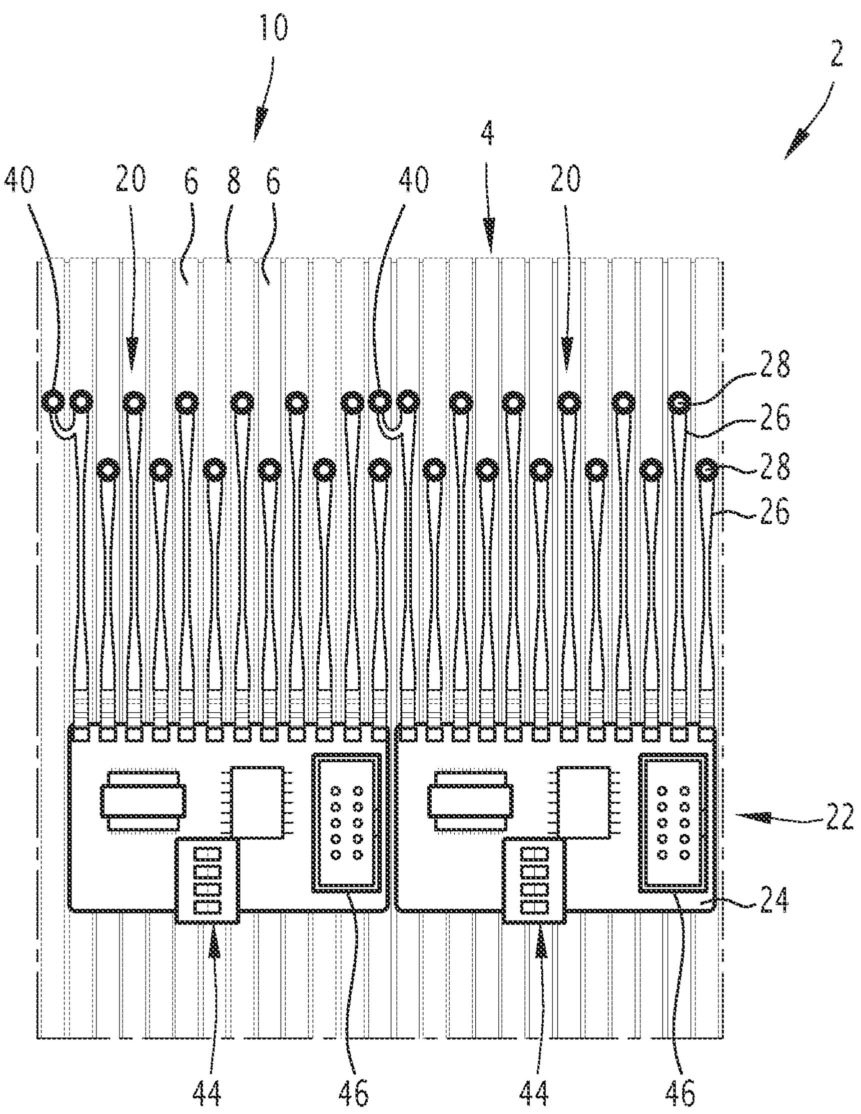
FIG. 5 is an enlarged view of area V in FIG. 1, showing two voltage measurement devices arranged side by side on the electrochemical reactor.

As illustrated in FIG. 5, it is possible to arrange the voltage measuring device 20 next to another voltage measuring device 20, with the additional electrical contact 40 carried by the first tooth 26 of the other voltage measuring device 20 and the electrical contact 28 of the last tooth 26 of the voltage measuring device 20 both being in contact with the same separator 6 without interfering with each other.

In a stack 4 comprising bipolar separators 6, two voltage measuring devices 20 so arranged side by side can measure the electrical voltages of the electrochemical cells 10 of two adjacent electrochemical cell groups 10, with the additional electrical contact 40 measuring the voltage of the electrochemical cell 10 located at the interface between the two adjacent electrochemical cell groups 10.

Such voltage measuring devices 20 can thus be arranged side by side along the stack 4 in a modular fashion, arranging as many voltage measuring devices 20 as necessary to measure the electrical voltages of a desired number of adjacent electrochemical cells 10.

In practice, it is not necessary to measure the voltage of all electrochemical cells 10 in the stack 4.

For example, it is possible to measure the voltage of electrochemical cells 10 in a first section of the stack 4, using a voltage measuring device 20 or a plurality of voltage measuring devices 20 arranged side by side, to measure the voltage of electrochemical cells 10 in a second section of the stack 4, by means of one or more voltage measuring devices 20 arranged side by side, without measuring the voltage in one of the electrochemical cells 10 located in an intermediate section located between the first section and the second section.

Optionally, the voltage measuring device 20 comprises an electronic measuring unit 44 carried by the base 24 and an electrical connector 46 carried by the base 24.

Each electrical contact 28, and where applicable, the additional electrical contact 40, is electrically connected to the electronic measuring unit 44.

The electrical connection between each electrical contact (electrical contact 28 or additional electrical contact 40) and the electronic measuring unit 44 is made, for example, via a conductive track 48 (FIG. 4) extending along the tooth 26 carrying this electrical contact.

The electronic measuring unit 44 is configured, for example, to process the electrical signals retrieved by the electrical contacts 28 and generate corresponding measurement signals.

The electronic measuring unit 44 is configured, for example, to transmit the measurement signals to an electronic device via the electrical connector 46.

The electrical signals are analog signals representative of the electrical potential of each electrical contact 28.

The measurement signals are analog signals or, preferably, digital signals.

For example, the electronic measuring unit 44 is configured to generate measurement signals that are representative of the voltage of each electrochemical cell 10 under consideration, in other words the potential difference between the two separators 6 of each electrochemical cell 10.

In this case, the electronic measuring unit 44 performs processing to determine the voltage of each electrochemical cell 10 from the electrical signals and generate a corresponding voltage measurement signal.

Alternatively, the electronic measuring unit 44 is configured to change the electrical signals recovered by the electrical contacts 28 into digital measurement signals for transmission to an electronic device via the electrical connector 46.

In this case, the electronic measuring unit 44 does not process the electrical signals to generate the voltage measurement signals, but merely changes the electrical signals into digital signals for transmission, the voltage of each electrochemical cell 10 under consideration being determined by the electronic device from the received digital signals, for example.

In cases where the electronic measuring unit 44 is configured to generate digital measurement signals (with or without processing performed within the electronic measuring unit 44 to determine voltage measurements) and transmit them to an electronic device via the electrical connector 46, the electronic measuring unit 44 preferably incorporates a digital galvanic isolation circuit 47 configured to electrically isolate the electronic device from the electronic measuring unit 44.

The digital galvanic isolation circuit 47 is, for example, configured to transmit information between the electronic measuring unit 44 and the electronic device in the form of light signals (optical isolation) or magnetic pulses (pulse transformer isolation) or any other isolation method . . . .

The electrical connector 46 is then electrically isolated from the rest of the voltage measuring device 20.

This is an advantage because the ground voltage of an electrochemical cell 10 of an electrochemical reactor can be several hundred volts, whereas electronic devices that exploit voltage measurements work with a ground voltage of only a few volts. Galvanic isolation as close as possible to the electrochemical reactor also protects the user.

Furthermore, the transformation of the analog signals into digital signals as close as possible to the electrochemical reactor 2 avoids the degradation of the analog signals by the electromagnetic pollution of the environment, compared to the case where the analog signals would be transmitted to an electronic device without prior digitization.

Advantageously, the electronic measuring unit 44 is designed to interface with a digital communication bus. In particular, the electrical connector 46 is designed to interface with a digital communication bus.

In this manner, a plurality of voltage measuring devices 20 may be connected to a single digital communication bus, with each voltage measuring device 20 connected to the digital communication bus via its electrical connector 46. The digital communication bus is connected to an electronic device responsible for retrieving and/or evaluating the voltage measurements. This has the advantage of simplifying the wiring.

The electronic measuring unit 44 comprises, for example, a dedicated integrated circuit (or ASIC for "Application Specific Integrated Circuit"). In addition, or alternatively, the electronic measuring unit 44 comprises a programmable logic circuit or an electronic data processing unit including a memory and a processor.

Advantageously, the support 22 of the voltage measuring device 20 is a printed circuit board. Thus, the support 22 may be formed simply, for example, by cutting a printed circuit board to form the base 24 and the teeth 26. Alternatively, it may be formed by additive manufacturing (or "3D printing").

When the support 22 is provided in the form of a printed circuit board, the electronic measuring unit 44 can be easily mounted on the support 22, for example, by attaching the electronic components of the electronic measuring unit 44 and connecting them to each other, for example, by means of electrical tracks.

Figure 6:
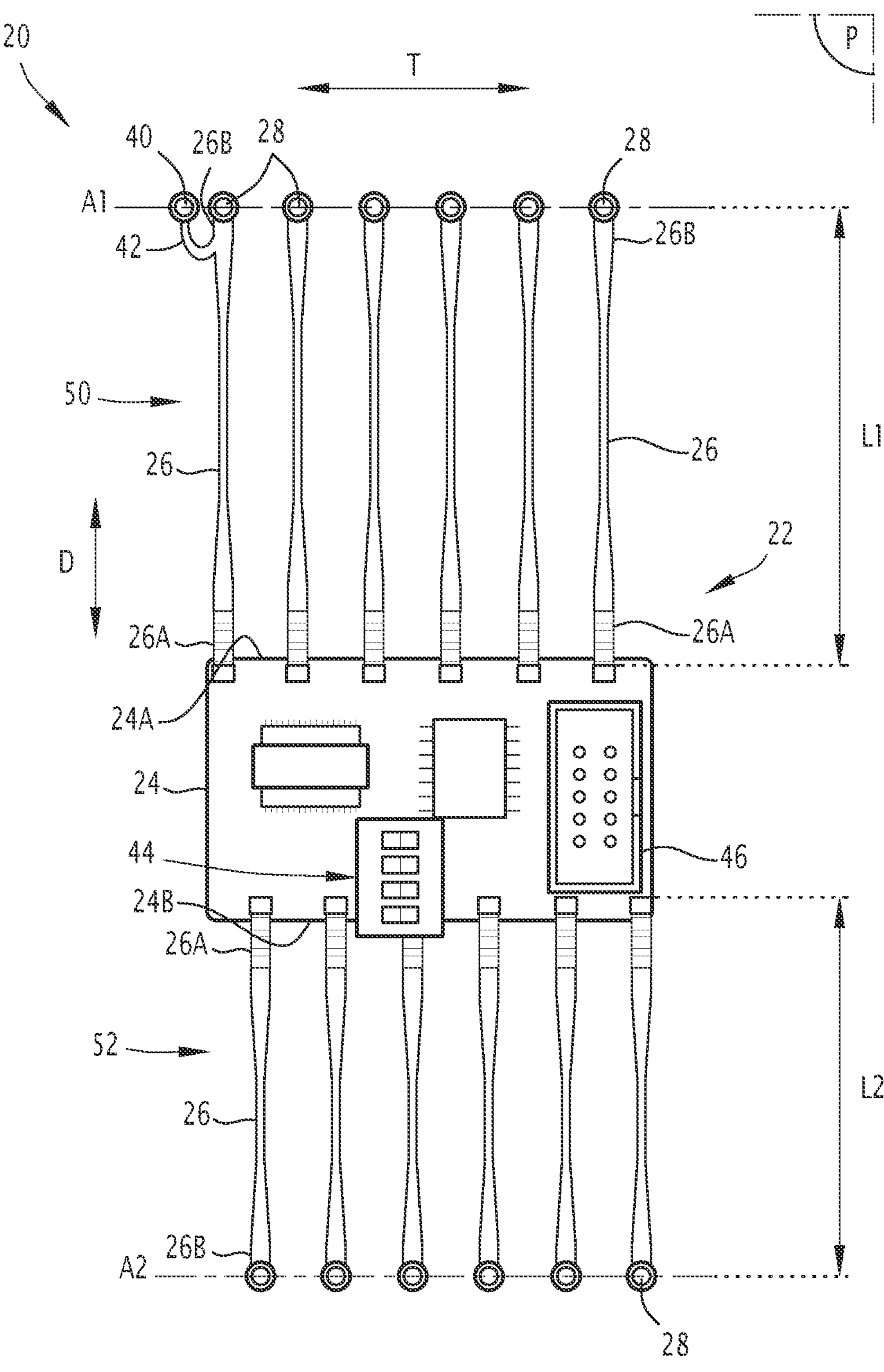
FIG. 6 is a front view of a voltage measurement device.

The voltage measuring device 20 in FIG. 6 differs from that in FIG. 3 in that the teeth 26 are divided into two rows of teeth 26 located on either side of the base 24.

The two rows of teeth 26 are hereinafter referred to as first row 50 and second row 52.

The teeth 26 of the first row 50 and the second row 52 extend from the base 24 in the same direction of extension D.

The teeth 26 of the first row 50 extend from one edge 24A of the base 24 (or "first edge 24A") and the teeth 26 of the second row 52 extend from another edge 24B of the base 24 (or "second edge 24B") opposite said first edge 24A.

The teeth 26 of the first row 50 and the teeth 26 of the second row 52 extend in opposite directions from the base 24.

The distal ends of the teeth 26 of the first row 50, located on one side of the base 24, are offset along the direction of extension D relative to the distal ends 26B of the teeth 26 of the second row 52.

As illustrated in FIG. 6, the teeth 26 of the first row 50 have their distal ends 26B aligned along an alignment axis A1, for example.

In a particular example of the embodiment, the alignment axis A1 of the distal ends 26B of the teeth 26 of the first row 50 is perpendicular to the direction of extension D.

For example, the teeth 26 of the second row 52 have their distal ends 26B aligned along an alignment axis A2.

In a particular example of the embodiment, the alignment axis A2 of the distal ends 26B of the teeth 26 of the second row 52 is perpendicular to the direction of extension D.

In one example of the embodiment, the teeth 26 of the first row 50 present a same first length L1 and/or the teeth 26 of the second row 52 present a same second length L2.

When the teeth 26 of the first row 50 present the same first length L1 and the teeth 26 of the second row 52 present the same second length L2, the first length L1 and the second length L2 are equal, for example.

Alternatively, one of the first length L1 and the second length L2 is strictly smaller or strictly larger than the other.

Preferably, in an embodiment wherein the teeth 26 form a first row 50 and a second row 52 located on opposite sides of the base 24, in each of the first row 50 and the second row 52, the spacing between two successive teeth 26 in the row is twice the spacing between two successive separators 6 in the stack 4.

Preferably, in one embodiment wherein the teeth 26 form a first row 50 and a second row 52 located on opposite sides of the base 24, the teeth 26 of the first row 50 and the teeth of the second row 52 are transversely offset, such that each gap between two teeth 26 of one of the first row 50 and the second row 52 is aligned along the direction of extension D with a tooth 26 from either the first row 50 and the second row.

Thus, in the stack 4, successive separators 6 of the electrochemical cells 10 the voltage of which is measured by the voltage measuring device 20 are alternately connected with the electrical contacts 28 of the teeth 26 of the first row 50 and the electrical contacts 28 of the teeth 26 of the second row 52.

A voltage measuring device 20 as represented in FIG. 6 can be placed adjacent to another similar voltage measuring device 20 without interference from the extension 42 carrying the additional contact 20 with the other voltage measuring device 20.

By means of the invention, a voltage measuring device 20 for measuring the voltage of a plurality of electrochemical cells 10 of a stack 4 can be obtained, wherein the voltage measuring device 20 can be installed in a simple manner on the stack 4.

In particular, the teeth 26 carrying the electrical contacts 28 allow each electrical contact 28 to make contact with a separator 6 of the stack 4. The laterally flexible teeth 26 allow for dimensional variations.

The distal ends 26 carrying the electrical contacts 28 are offset along the direction of extension of the teeth 26, so that the distal ends 26B carrying the electrical contacts 28 are not side by side.

This facilitates assembly by avoiding interference between the teeth 26 and/or by allowing greater lateral flexing movement of each tooth 26 during assembly or operation of the electrochemical reactor.

It is possible to have closely spaced teeth 26, allowing the voltage measuring device 20 to be used with an electrochemical reactor 2 the separators 6 of which are very thin.

In particular, the distribution of the teeth 26 along two opposing edges 24A and 24B of the base 24 allows for increased spacing between two adjacent electrical contacts 28 of a row of teeth 26.

This arrangement is advantageous in the case where the electrochemical cells 10 are thin which limits the possible spacing between two adjacent electrical contacts 28 of a row of teeth 26.

Furthermore, the fact that the teeth 26 are distributed on two opposite edges 24A and 24B of the base 24 gives the device 20 better mechanical strength.

A device 20 having a single row of teeth 26 (FIG. 4) will have a tendency to flex and pull towards the stack 4 of the electrochemical cells 10, whereas the presence of teeth 26 on two opposing edges 24A and 24B of the base 24 reduces this flexing effect.

The invention is not limited to the above-described examples of the embodiments and variants. Other examples of the embodiment and other variants are conceivable.

For example, the teeth 26 may have their ends aligned along an alignment axis oblique relative to the direction of extension D (in other words an alignment axis not parallel with the direction of extension D and not perpendicular to the direction of extension D).

In particular, it is possible to provide, in the same row of teeth 26, a first group of teeth 26 the distal ends 26B of which are aligned along a first alignment axis and a second group of teeth 26 the distal ends 26B of which are aligned along a second alignment axis distinct from the first alignment axis, the first alignment axis being perpendicular or oblique relative to the direction of extension D and the second alignment axis being perpendicular or oblique relative to the direction of extension, the first extension axis and the second extension axis being parallel to each other or making a non-zero angle between them.

Furthermore, when the teeth 26 are distributed between a first row 30 and a second row 50, the teeth 26 of each row 30, 50 are not necessarily aligned along an alignment axis perpendicular to the direction of extension D.

In particular, the paragraph above applies to the teeth in each of the first row 30 and the second row 50.

Thus, in each of the first row 30 and the second row 50, it is possible to provide a first group of teeth 26 the distal ends 26B of which are aligned along a first alignment axis and a second group of teeth 26 the distal ends 26B of which are aligned along a second alignment axis distinct from the first alignment axis, the first alignment axis being perpendicular or oblique relative to the direction of extension D and the second alignment axis being perpendicular or oblique relative to the direction of extension, the first extension axis and the second extension axis being parallel to each other or at a non-zero angle to each other.

In addition, the support 22 may include teeth 26 the distal ends 26B of which are not aligned along an alignment axis.

In particular, a row of teeth 26 of the support 22 may comprise a group of teeth 26 the distal ends 26B of which are aligned along an alignment axis and a group of teeth 26 the distal ends 26B of which are not aligned.

The invention claimed is:

1. A voltage measuring device configured to measure a voltage of a plurality of electrochemical cells of an electrochemical reactor formed of a stack of separators and membrane-electrode assemblies, each of the electrochemical cells being formed of one of the membrane-electrode assemblies interposed between two of the separators, the voltage measuring device comprising:

- a support comprising:
  - a base having an edge; and
  - a plurality of teeth arranged in a row, each of the teeth extending from the edge of the base along a common direction of extension, each of the teeth comprising:
    - a proximal end connected to the edge of the base;
    - a free distal end; and only one electrical contact disposed on the free distal end, the electrical contact being configured to make contact with one of the separators, wherein each of the teeth has one of a first length and a second length measured from the edge of the base to the contact, the first length and the second length being unequal, and wherein the teeth are arranged on the base so that the teeth having the first length alternate with the teeth having the second length.

2. The voltage measuring device according to claim 1, wherein the plurality of teeth comprises:

a first set of teeth whose said free distal ends are aligned along a first alignment axis; and a second set of teeth whose said free distal ends are offset relative to the first alignment axis, and wherein each said tooth of the first set and of the second set has the proximal end thereof arranged at a same distance from the first alignment axis.

3. The voltage measuring device according to claim 2, wherein the first alignment axis is perpendicular to the direction of extension.

4. The voltage measuring device according to claim 1, wherein each of the plurality of teeth comprises:

a progressively decreasing and then increasing width from the proximal end of the tooth to the distal end of the tooth.

5. The voltage measuring device according to claim 1, further comprising an electronic measuring unit, each said electrical contact being connected to the electronic measuring unit.

6. An electrochemical system, comprising:

electrochemical cells, and at least one voltage measuring device according to claim 1 configured to measure the voltage of the electrochemical cells.

7. The voltage measuring device according to claim 1, wherein all of the plurality of teeth extend to be coplanar to one another.

8. A voltage measuring device configured to measure a voltage of a plurality of electrochemical cells of an electrochemical reactor formed of a stack of separators and membrane-electrode assemblies, each of the electrochemical cells being formed of one of the membrane-electrode assemblies interposed between two of the separators, the voltage measuring device comprising:

a support comprising:

a base having an edge;

a double-contact tooth; and a plurality of single-contact teeth arranged in a row, each of the single-contact teeth extending from the edge of the base along a common direction of extension, each of the single-contact teeth comprising:

a proximal end connected to the edge of the base;

a free distal end; and only one electrical contact disposed on the free distal end, the electrical contact being configured to make contact with one of the separators;

wherein the double-contact tooth extends from the edge of the base along the common direction of extension, the double-contact tooth comprising:

said proximal end connected to the edge of the base;

said free distal end;

a first electrical contact disposed on the free distal end; and an additional electrical contact also disposed on the free distal end, wherein each of the single-contact teeth has one of a first length and a second length measured from the edge of the base to the contact, the first length and the second length being unequal, wherein the single-contact teeth are arranged on the base so that the single-contact teeth having the first length alternate with the single-contact teeth having the second length, wherein the first electrical contact and the additional electrical contact of the double-contact tooth are both arranged at either the first length or the second length from the edge of the base, and wherein the double-contact tooth is arranged on the edge of the base at one end of the row of the single-contact teeth.

9. The voltage measuring device according to claim 8:

wherein the double-contact tooth and the plurality of single-contact teeth are distributed in:

a first set of teeth whose said free distal ends are aligned along a first alignment axis; and a second set of teeth whose said free distal ends are offset relative to the first alignment axis, and wherein each said tooth of the first set and of the second set has the proximal end thereof arranged at same distance from the first alignment axis, the single-contact teeth having the first length alternating with the single-contact teeth having the second length.

10. The voltage measuring device according to claim 9, wherein the first alignment axis is perpendicular to the direction of extension.

11. The voltage measuring device according to claim 9, wherein the first set of teeth and the second set of teeth are arranged to alternate to form a row of teeth.

12. The voltage measuring device according to claim 9, wherein the free distal ends of the second set of teeth:

are offset relative to the first alignment axis, and are aligned along a second alignment axis distinct from the first alignment axis.

13. The voltage measuring device according to claim 12, wherein the second alignment axis is perpendicular to the direction of extension and parallel to the first alignment axis.

14. The voltage measuring device according to claim 8, further comprising an electronic measuring unit, each said electrical contact being connected to the electronic measuring unit.

15. The voltage measuring device according to claim 14, further comprising a connector, configured to connect the voltage measuring device to an electronic apparatus.

16. An electrochemical system, comprising:

electrochemical cells, and at least one voltage measuring device according to claim 8 configured to measure the voltage of the electrochemical cells.

17. The voltage measuring device according to claim 8, wherein the double-contact tooth and the plurality of single-contact teeth extend to be coplanar to one another.

18. The voltage measuring device according to claim 8, wherein the double-contact tooth has a U-shape profile at the double-contact tooth's free distal end, with two branches in the U-shape ending respectively with a first free distal end and a second free distal end of the double-contact tooth.

* * * * *